United States Patent [19]

Röck et al.

[11] Patent Number: 4,768,259
[45] Date of Patent: Sep. 6, 1988

[54] MOUNTING PLATE, IN PARTICULAR FOR HINGES

[75] Inventors: Erich Röck, Höchst; Helmut Rupprechter, Lauterach, both of Austria

[73] Assignee: Julius Blum Gesellschaft m.b.H., Höchst, Austria

[21] Appl. No.: 937,621

[22] Filed: Dec. 1, 1986

[30] Foreign Application Priority Data

Dec. 4, 1985 [AT] Austria ................................. 3512/85

[51] Int. Cl.⁴ ............................................... E05D 5/02
[52] U.S. Cl. ........................................ 16/382; 16/384; 411/352; 411/521; 411/918; 29/464
[58] Field of Search ................. 16/384, 382, DIG. 43; 29/464; 411/352, 521, 918

[56] References Cited

U.S. PATENT DOCUMENTS

| | | | |
|---|---|---|---|
| 2,853,114 | 9/1958 | Barry | 411/352 |
| 3,195,600 | 7/1965 | Middleton, Jr. | 411/352 |
| 4,659,246 | 4/1987 | Sugiyama | 411/521 |

Primary Examiner—Nicholas P. Godici
Assistant Examiner—Samuel M. Heinrich
Attorney, Agent, or Firm—Wenderoth, Lind & Ponack

[57] ABSTRACT

A hinge mounting plate on which a hinge arm is fastenable is adjustable in one direction and fastenable to a furniture part, for example a furniture side wall, by means of fastening screws extending through elongated holes in the mounting plate. In each elongated hole is provided two flaps projecting from the rim of the hole having free front faces pivotally holding the respective fastening screw. The fastening screws have countersunk heads, and when the fastening screws are inserted the countersunk heads press the flaps away from the screw cores.

9 Claims, 2 Drawing Sheets

MOUNTING PLATE, IN PARTICULAR FOR HINGES

FIELD AND BACKGROUND OF THE INVENTION

The invention relates to a hinge mounting plate assembly to which a hinge arm is fastenable and including a mounting plate adjustable in one direction and fastenable to a furniture part, for example a furniture side wall, by means of fastening screws which have projecting lower screw head sides and extend through elongated holes in the mounting plate, two shoulders projecting from the rim of each elongated hole pivotally holding the respective fastening screw between their free front faces.

Mounting plates of this kind for hinges or furniture connectors are widely known and are frequently used in modern furniture production, in particular in the manufacture of kitchen furniture.

It is the advantage of such mounting plates that they can be mounted at the furniture side wall, and that the actual hinge arm, which is usually fastened by means of hinge links or the like to a dowel casing inserted in the furniture door, can be mounted on the mounting plate when the piece of furniture is final assembled.

Moreover, mounting plates of this kind allow a later adjustment and positioning of the hinge arm, whereby tolerances which may have been caused by drilling the fastening holes for the mounting plate or during fastening of the mounting plate can easily be compensated.

Modern hinges allow adjustment in the direction of the depth of the piece of furniture and in the direction door joint.

Generally the prerequisites for a depth adjustment are provided in the form of a slot in the hinge arm for the fastening screw so that vertical adjustment which is possible through the mounting plate is desired as an additional possibility of adjustment.

Experience has shown that it is not necessary to adjust each hinge in each direction after mounting thereof, but that on the contrary in most cases the fastening holes for the mounting plate have been precisely drilled and that they are exactly aligned.

Hence, if the mounting plate always has to be aligned in the direction of the height of the piece of furniture, no matter if the fastening holes are precisely drilled or not, this means unnecessary additional work in many cases.

AT-PS No. 348 892 describes a mounting plate by means of which an adjustment is possible, if necessary, but whose precise position need not be adjusted every time. When the bores for the fastening bolts are in the correct position, the mounting plate need only be mounted onto the bores by means of the fastening bolts, whereupon one fastening bolt after the other is inserted and fastened. During mounting operations, the mounting plate is held in the O-position by means of the fastening screws. When the fastening screws are inserted in a certain manner or when they are first screwed into the furniture side wall and then loosened again, the mounting plate is displaceable from the O-position in two directions.

SUMMARY OF THE INVENTION

It is the object of the invention to improve a mounting plate assembly of the afore-described kind by adapting it to be manufactured of a relatively thin material, for example of sheet metal, and providing at the same time a secure support for the screws in the zero position of the mounting plate. Zero position means that position in which the mounting plate is held by the screws before the latter-mentioned are finally screwed into the furniture side wall or the like. This position corresponds to the desired position of the mounting plate at the piece of furniture when the fastening holes have been drilled correctly.

The object of the invention is attained in that the shoulders are bendable flaps which are inclined towards the mounting plane of the mounting plate.

Front faces of the flaps are preferably concave and are adapted to the outer surface of the screws, thus allowing rotation of the screws, whereas displacement of the screws in a plane perpendicular to the screw axes is prevented. The fastening screws have thread-free portions at the sides of or adjacent their heads. In contrast to the arrangement according to AT-PS No. 348 892 mentioned above, such portion need not be narrower than the threaded part.

It is advantageously provided that the fastening screws have flat countersunk or raised countersunk heads.

It is further advantageously provided that the angle of inclination between the flaps and the mounting plane is smaller than the angle of inclination between the flat countersunk heads and the axes of the fastening screws.

An advantageous embodiment provides that at the ends of the elongated holes there are provided limiting surfaces which are substantially shaped like circular segments and inclined towards the mounting plane of the mounting plate.

The mounting plate may be completely punched of sheet metal which allows a very economical production. When the mounting plate has edges that are angled to the mounting plane a spring effect is produced through the elasticity of the sheet steel, when the fastening screws are being fastened. Such spring effect improves the hold of the mounting plate.

A further embodiment advantageously provides that the front faces of the flaps are angular, when viewed from the side, and comprise two portions. One portion abuts at the outer surface of the screw, and the second portion abuts at the thread.

A support of the screws in the mounting plate without clearance is obtained by dimensioning the thickness of the flaps to equal to the height of the thread turn of the fastening screws minus the thickness of the thread.

The mounting plate advantageously has, at least in the region of the elongated holes, an edge which is angled with respect to the mounting plane. Thus, the spring effect of the mounting plate can be improved, when the fastening screws are fastened.

BRIEF DESCRIPTION OF THE DRAWINGS

An embodiment of the invention will now be described in more detail with reference to the accompanying drawings, in which.

DETAILED DESCRIPTION OF THE INVENTION

Figure 1:
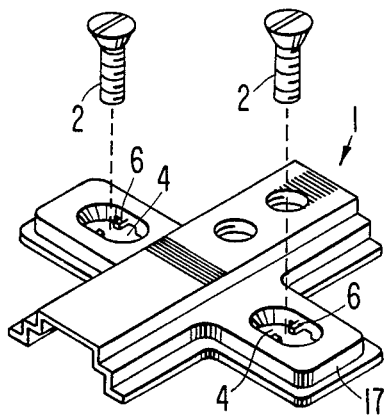
FIG. 1 is a diagrammatic view of a mounting plate according to the invention.
Figure 2:
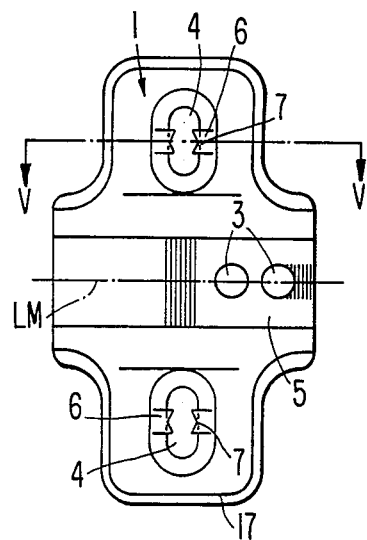
FIG. 2 is a top view of the mounting plate according to the invention shown without fastening screws.
Figure 3:
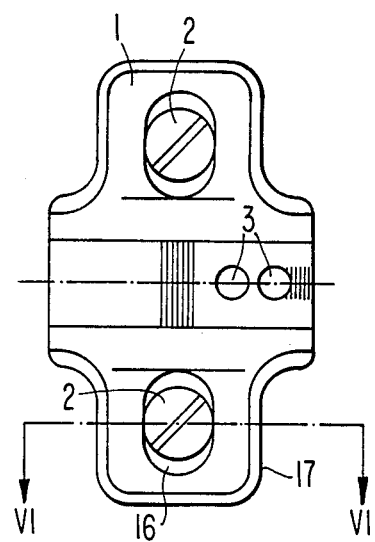
FIG. 3 is a top view of the mounting plate according to the invention, fastening screws being shown inserted.
Figure 4:
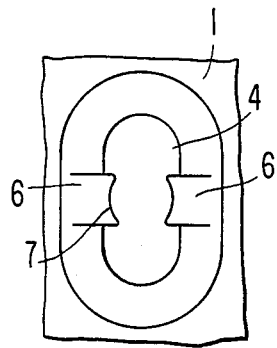
FIG. 4 is a top view of an elongated hole of the mounting plate.
Figure 5:
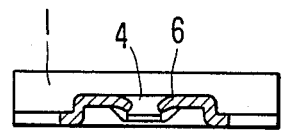
FIG. 5 is a sectional view along line V—V of FIG. 2.

A hinge arm can be mounted on a mounting plate, for example by means of a fastening screw which extends into female threads 3 of the mounting plate 1. The aforementioned hinge parts are not shown in the drawings and will not be described in detail because they are not directly related to the subject of the present invention.

As can be seen from the drawings, the mounting plate 1 has two elongated holes 4. The longitudinal axes of the elongated holes 4 are aligned perpendicularly to the longitudinal center axis LM of a holding member 5 for the hinge arm.

Figure 7:
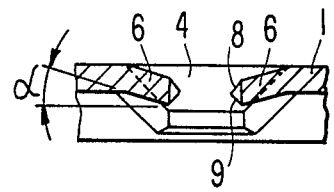
FIG. 7 is a sectional view along line V—V of FIG. 2 but at an enlarged scale.

Flaps 6 are punched out of each elongated hole 4 and project from their edges. The flaps 6 have concave front faces 7, which are angled, when viewed from the side (FIG. 7). The front face 7 of each flap 6 has an upper portion 8 and a lower portion 9.

Figure 6:
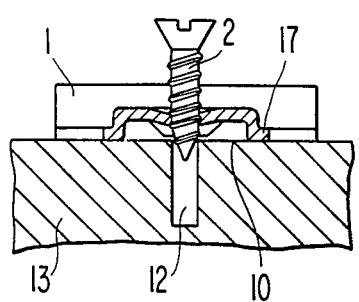
FIG. 6 is a sectional view along line VI—VI of FIG. 3.
Figure 8:
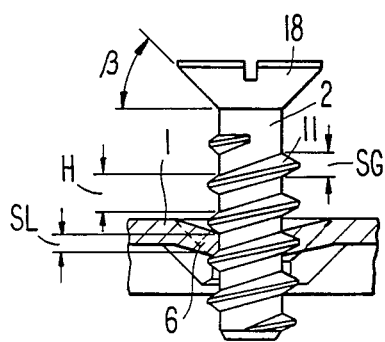
FIG. 8 is a sectional view the same as FIG. 7, but showing a fastening screw being screwed into the mounting plate.

The flaps 6 are angled with respect to the mounting plane 10 of the mounting plate 1 (FIG. 6). A fastening screw 2 is held between the two flaps 6 of each elongated hole 4. The thickness SL of a flap 6 corresponds to the height H of a thread turn minus the thickness SG of the thread 11 of screw 2. As can be seen from FIG. 8, the flaps 6 are snuggly received between superjacent portions of the thread 11.

The fastening screws 2 can be screwed between the flaps 6 like in a female thread and are thereby undisplaceably held with respect to the elongated holes 4.

The mounting plate 1 according to the invention is mounted as follows:

The fastening screws 2 are screwed into the mounting plate 1 to such an extend that they are in the position illustrated in FIG. 6 or that their points or tip ends project slightly farther underneath the mounting plate 1.

The mounting plate 1 is then positioned with the front or tip ends of the fastening screws 2 pushed into holes 12 of a furniture side wall 13. When the mounting plate 1 is in the correct position, one fastening screw 2 after the other is fastened in a normal manner until the heads 18 of the fastening screws 2 abut the mounting plate 1. Thereby heads 18 of the fastening screws press the flaps 6 in the direction of arrows 15 (FIG. 9) towards the furniture side wall 13 and outwards with respect to the elongated holes 4.

Figure 9:
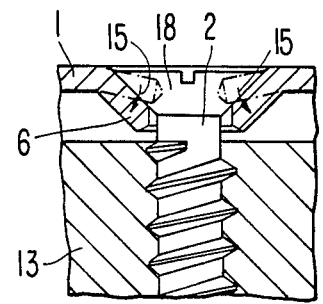
FIG. 9 is a sectional view the same as FIG. 7, but showing the fastening screw completely inserted.

If the position of the mounting plate 1 has to be corrected, both fastening screws 2 are screwed out of the furniture side wall to such an extent only that their heads 18 do not clamp the mounting plate 1. As the flaps 6 have been pressed apart in the direction of arrows 15, as shown in FIG. 9, and are removed from the thread core of the fastening screws 2, the mounting plate 1 is now displaceable over the length of the elongated holes 4. After such positoning operation, the fastening screws 2 are finally fastened, and the mounting plate 1 is held in a clamping manner by the fastening screws 2.

The screws 2 shown are of the flat countersunk head type. The term "flat" countersunk head relates only to the upper side of the screw heads 18. Raised countersunk screw heads could equally be used. It is important that the screw heads 18 are not flat at their lower sides so that they press the flaps 6 toward the furniture side wall when the fastening screws are fastened. The mounting plate 1 advantageously has an angled outer edge 17 which produces a certain spring effect, when the fastening screws 2 are being fastened. The ends of elongated holes 4 have limiting surfaces 16 substantially shaped as circular segments and inclined toward the mounting plate 10 of mounting plate 1.

What is claimed is:

1. In a hinge mounting plate assembly to which a hinge arm is fastenable and that is fastenable to a furniture part, for example a furniture side wall, to be adjustable in one direction, said assembly comprising a mounting plate having therein holes elongated in said direction, and fastening screws for extending through said holes in said mounting plate for fastening said mounting plate to the furniture part, each said hole being defined by a rim having projecting therefrom two shoulders to pivotally hold between free ends thereof a respective said fastening screw, the improvement wherein:

said two shoulders of each said hole comprise bendable flaps inclined toward the mounting plane of said mounting plate; and each said fastening screw includes a head with a projecting, non-planar lower side for, upon said fastening screw being screwed through the respective said hole into the furniture part, bending the respective said two flaps toward said mounting plane.

2. The improvement claimed in claim 1, wherein said fastening screws have flat or raised countersunk heads.

3. The improvement claimed in claim 2, wherein the angle of inclination between said flaps and said mounting plane is smaller than the angle of inclination between said countersunk heads and the axes of said fastening screws.

4. The improvement claimed in claim 1, wherein the inner edge of each of said flaps is angular when viewed from the side and includes two portions.

5. The improvement claimed in claim 1, wherein the thickness of said flaps is equal to the height of the thread turn of said fastening screws minus the thickness of the thread thereof.

6. The improvement claimed in claim 1, wherein said mounting plate has, at least in the region of said elongated holes, an edge angled with respect to said mounting plane.

7. The improvement claimed in claim 1, wherein opposite ends of each of said elongated holes are defined by limiting surfaces substantially shaped like circular segments and inclined towards said mounting plane of said mounting plate.

8. The improvement claimed in claim 1, wherein said mounting plate is punched of sheet metal and has edges angled with respect to said mounting plane.

9. The improvement claimed in claim 1, wherein the inner edge of each of said two shoulders projecting from the rims of each of said elongated holes are concave.

* * * * *